United States Patent
Shikimachi et al.

[11] Patent Number: 5,975,623
[45] Date of Patent: Nov. 2, 1999

[54] COLLISION ENERGY ABSORBING STRUCTURE OF VEHICLE BODY UPPER PORTION OF AUTOMOBILE

[75] Inventors: Kazutomo Shikimachi, Toyota; Tatsuya Sugamoto, Okazaki; Hisataka Kato, Toyota; Narihide Matsuyama, Nagoya; Kenji Gondo, Toyota, all of Japan

[73] Assignee: Toyota Jidosha Kabushiki Kaisha, Toyota, Japan

[21] Appl. No.: 08/689,017

[22] Filed: Jul. 30, 1996

[30] Foreign Application Priority Data

Jul. 31, 1995 [JP] Japan ................................. 7-213027
Jul. 31, 1995 [JP] Japan ................................. 7-213029
Jan. 17, 1996 [JP] Japan ................................. 8-022994

[51] Int. Cl.⁶ .................................................. B60R 27/00
[52] U.S. Cl. ........................... 296/189; 296/210; 296/214
[58] Field of Search .................................. 296/188, 189, 296/210, 214, 39.1; 280/751

[56] References Cited

U.S. PATENT DOCUMENTS 4,229,036  10/1980  Toda ............................... 296/39.1 X
4,938,525  7/1990   Tamauchi ........................ 296/188 X
5,163,730  11/1992  Welch .
5,560,672  10/1996  Lim et al. ............................ 296/189

FOREIGN PATENT DOCUMENTS

302726    2/1989   European Pat. Off. ............... 296/188
23 49 830 4/1975   Germany .
226369   10/1986   Japan ................................. 296/188
65475     3/1991   Japan ................................. 296/189
91-19719 11/1991   Japan .
6-211161  8/1994   Japan .
7-246953  9/1995   Japan .

*Primary Examiner*—Joseph D. Pape
*Attorney, Agent, or Firm*—Pillsbury Madison & Sutro LLP

[57] ABSTRACT

A collision energy absorbing structure of a vehicle body upper portion of an automobile having a roofside rail (20) extending in the forward and backward direction and formed to be a closed structure with an outer panel (30) and an inner panel (32) includes a metal energy absorbing panel (22) and a resin interior trim material (24). The energy absorbing panel (22) has a thickness smaller than the thicknesses of the outer panel (30) and the inner panel (32) and is arranged with a space (D) inward of the inner panel. The terminal portion in the longitudinal direction of the energy absorbing panel (22) has a tendency that energy absorption reduces but the tendency is compensated by resin material (26, 28).

19 Claims, 12 Drawing Sheets

DISTANCE FROM REQUIRED
ENERGY GENERATING POINT

COLLISION ENERGY ABSORBING STRUCTURE OF VEHICLE BODY UPPER PORTION OF AUTOMOBILE

BACKGROUND OF THE INVENTION

1. Field of the Invention

This invention relates to a collision energy absorbing structure of a vehicle body upper portion of an automobile, and more particularly to a collision energy absorbing structure of a vehicle body upper portion of an automobile having a structural member extending in the longitudinal direction such as a roofside rail or a header, and an interior trim material such as a roofside garnish or a ceiling trim.

2. Description of the Related Art

A proposed collision energy absorbing structure of a vehicle body upper portion of an automobile comprises a structural member extending in the longitudinal direction and formed as a closed structure with respective flanges of an outer panel and an inner panel joined together. The inner panel arranged with a space that is inward relative to the outer panel, as viewed from an interior of a passenger compartment, that is, inward of the outer panel (Japanese Patent Appln. Public Disclosure No. 7-246953). The collision energy absorbing structure related to this proposal comprises a metal energy absorbing panel having a smaller wall thickness than that of the outer panel and that of the inner panel, which is arranged with a space inward of the inner panel and joined to the flange portions of the structural member.

In the above described collision absorbing structure which uses a metal energy absorbing panel, there is no uncrushed portion, as opposed to when an energy absorbing body such as a resin lattice is used, all the portions except the end terminal portion of the energy absorbing panel can be deformed to provide a predetermined amount of energy absorption.

SUMMARY OF THE INVENTION

To minimize material use, or because of production restrictions, the above-mentioned energy absorbing panel is sometimes formed to cover the interior of the inner panel of the structural member over only a predetermined longitudinal length rather than the entire longitudinal length in the longitudinal direction of the structural member.

Figure 7A:
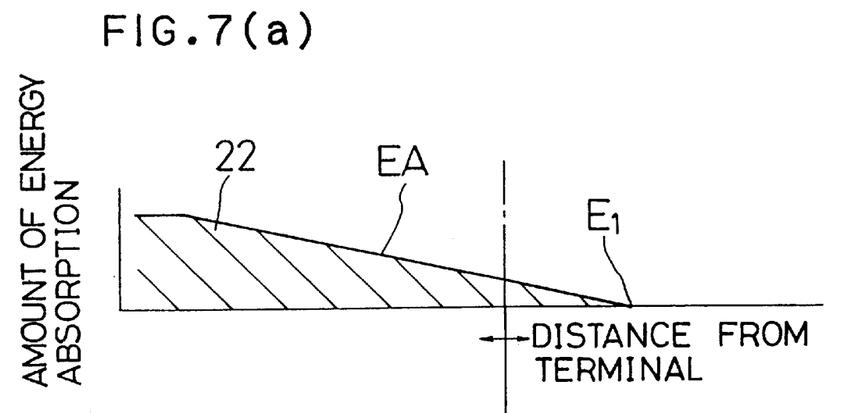
FIG. 7(a) the energy absorbing panel.
Figure 7B:
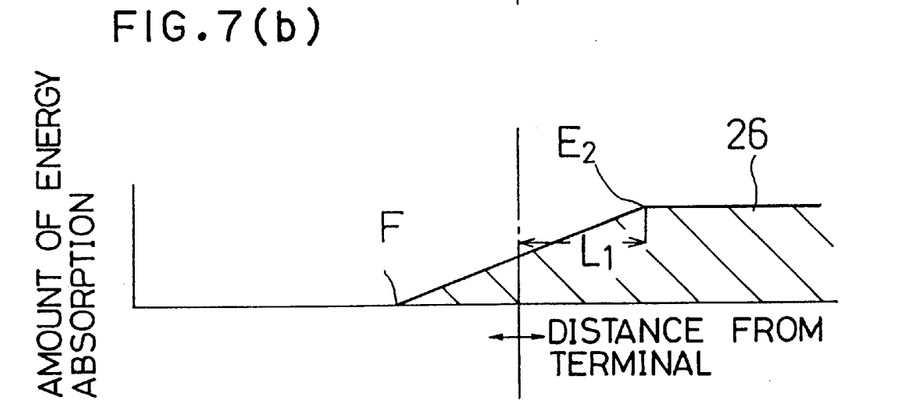
FIG. 7(b) the energy absorbing means arranged to be adjacent to the energy absorbing panel.
Figure 7C:
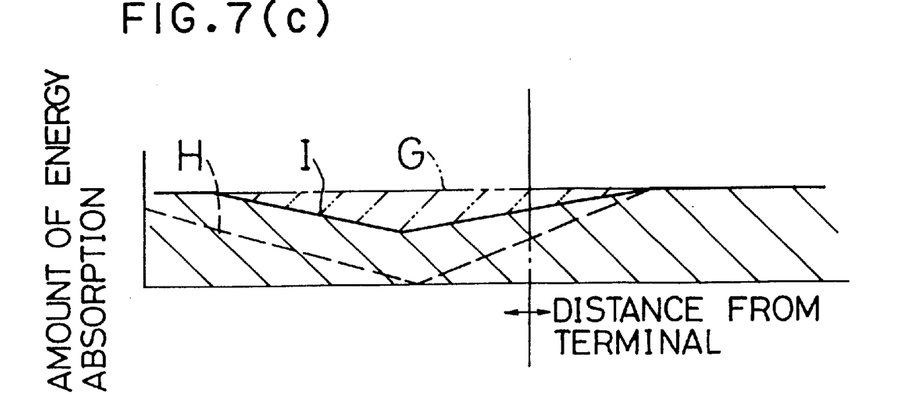
FIG. 7(c) the energy absorbing panel combined with the energy absorbing means.
Figure 7D:
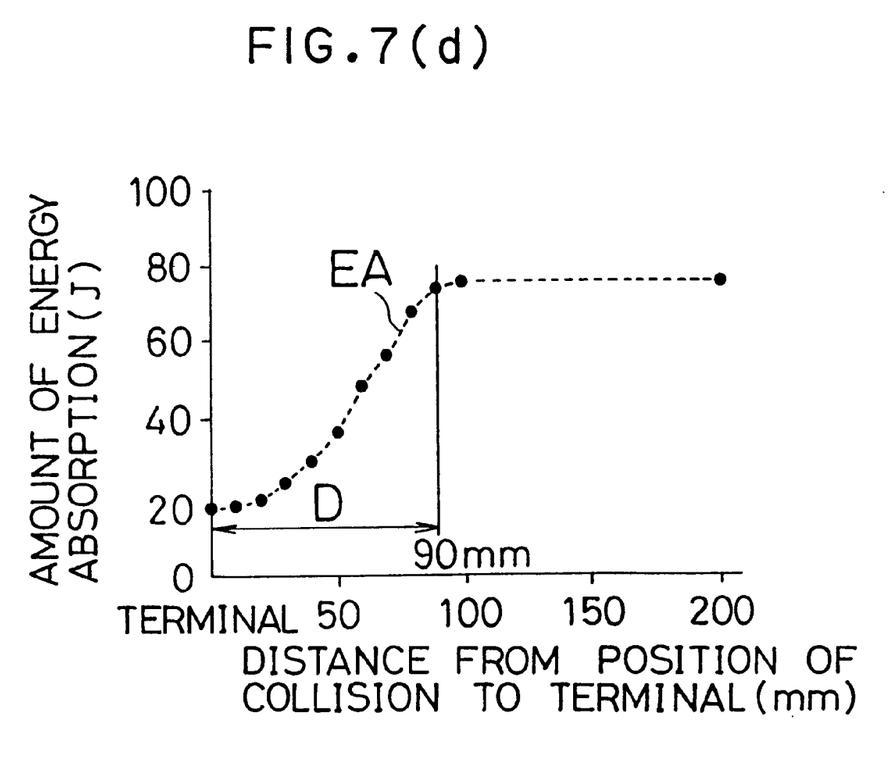
FIG. 7(d) a result of an experiment of the energy absorbing panel.

FIG. 7(a) shows the relationship between the amount of energy absorption and the distance from the terminal portion of the panel indicated graphically as a result of colliding a test head form against the terminal part of the energy absorbing panel. Within a certain range from a terminal part $E_1$, an amount of energy absorption EA gradually decreases toward the terminal part $E_1$. As shown in FIG. 7(d), the range D is substantially 90 mm for energy absorbing plane of 0.4–0.8 mm thickness. It is considered that this is because the rigidity of the energy absorbing panel is reduced toward the terminal part. As mentioned above, therefore, when the energy absorbing panel does not cover the entire length of the structural member, it is likely that a great collision force should be exerted to the terminal part of the energy absorbing panel from the structural member.

An object of the present invention is to provide a collision energy absorbing structure of a vehicle body upper portion of an automobile capable of compensating a reduction in an amount of energy absorption of the terminal part of an energy absorbing panel.

There is provided in the present invention a collision energy absorbing structure of a vehicle body upper portion of an automobile comprising: a structural member extending in the longitudinal direction formed as a closed structure with respective flange portions of an outer panel and an inner panel joined together, the inner panel being arranged with a first space inward of the outer panel; and a resin interior trim material arranged with a second space inward of the inner panel. This collision energy absorbing structure has a metal energy absorbing panel and an energy compensating means. The energy absorbing panel has a smaller thickness than that of the outer panel and that of the inner panel, and is arranged within the second space with a third space inward of the inner panel, extending over a predetermined length in the longitudinal direction, and joined to the flange portions of the structural member. The energy compensating means compensates a reduction in the amount of energy absorption of at least one terminal portion in the longitudinal direction of the energy absorbing panel.

In one aspect of the present invention, the energy compensating means includes first energy absorbing means provided in the interior trim material in the longitudinal extension of the energy absorbing panel. For the energy absorbing means, a resin lattice or urethane foam may be used. In one embodiment, the energy compensating means further includes second energy absorbing means formed separately from the energy absorbing panel and the first energy absorbing means and arranged to adjoin the terminal portion of the energy absorbing panel and the first energy absorbing means. In another embodiment, the energy compensating means is formed by the first energy absorbing means adjacent to the terminal portion of the energy absorbing panel and a reinforcing structure provided at the terminal portion of the energy absorbing panel.

In another aspect of the present invention, the energy compensating means includes a metal second energy absorbing panel having substantially the same sectional configuration and substantially the same thickness as those of the energy absorbing panel. The second energy absorbing panel is arranged in the longitudinal direction of the energy absorbing panel through second energy compensating means which also compensates the amount of energy absorption at its own terminal portion of the second energy absorbing panel and is joined to the flange portions of the structural member. The two energy absorbing panels respectively have an abdominal portion arranged with the third space from the inner panel, and flange portions connected to the abdominal portion. In one embodiment, the second energy compensating means is formed to be a structure wherein the abdominal portions are not joined but the terminal portion of the second energy absorbing panel is overlapped on the terminal portion of the energy absorbing panel. In another embodiment, the second energy compensating means is formed to be a structure wherein the second energy absorbing panel is arranged adjacent to the energy absorbing panel so that the terminal portion of the second energy absorbing panel is not overlapped on the terminal portion of the energy absorbing panel, and wherein the abdominal portions of the two energy absorbing panels are joined at one portions of the respective abdominal portions.

According to the invention, when a collision force of more than a predetermined magnitude directed outward of a passenger compartment is exerted from an interior trim material to the metal energy absorbing panel, the energy absorbing panel is deformed to absorb the collision energy. When the collision force is exerted to the terminal part of the energy absorbing panel, the energy absorbing panel and the energy compensating means are deformed to compensate the amount of energy reduction of the terminal part.

In the metal energy absorbing panel, since the increase of a load relative to an amount of stroke is rapid, an energy absorption that absorbs a collision force can be achieved by a small amount of stroke, or displacement and a small peak load. Also, as a result of the metal energy absorbing panel being joined to the flange joint portion of the structural member, the panel can improve in the rigidity of the structural member. Since the reduction in the amount of energy absorption at the terminal part of the energy absorbing panel is compensated by the energy compensating means, the range of absorbing the collision energy by the energy absorbing panel can be broadened.

The aforementioned or other objects, characteristics and effects of the present invention will become clear from the following detailed description with reference to the drawings.

BRIEF DESCRIPTION OF THE DRAWINGS

FIG. 5 shows another embodiment of the collision energy absorbing structure of a vehicle body upper portion of an automobile according to the present invention, in which

FIG. 6 shows still another embodiment of the collision energy absorbing structure of a vehicle body upper portion of an automobile according to the present invention, in which

FIG. 7 is a graph showing the relationship between the amount of energy absorption of the energy absorbing panel and the energy absorbing means and the distance from the terminal part of the panel, showing.

FIG. 8 shows still another embodiment of the collision energy absorbing structure of a vehicle body upper portion of an automobile relative to the present invention, in which

FIG. 9 shows still another embodiment of the collision energy absorbing structure of a vehicle body upper portion of an automobile relative to the present invention, in which

FIG. 10 shows still another embodiment of the collision energy absorbing structure of a vehicle body upper portion of an automobile according to the present invention, in which

FIG. 11 shows still another embodiment of the collision energy absorbing structure of a vehicle body upper portion of an automobile according to the present invention, in which

DESCRIPTION OF THE PREFERRED EMBODIMENTS

Figure 1:
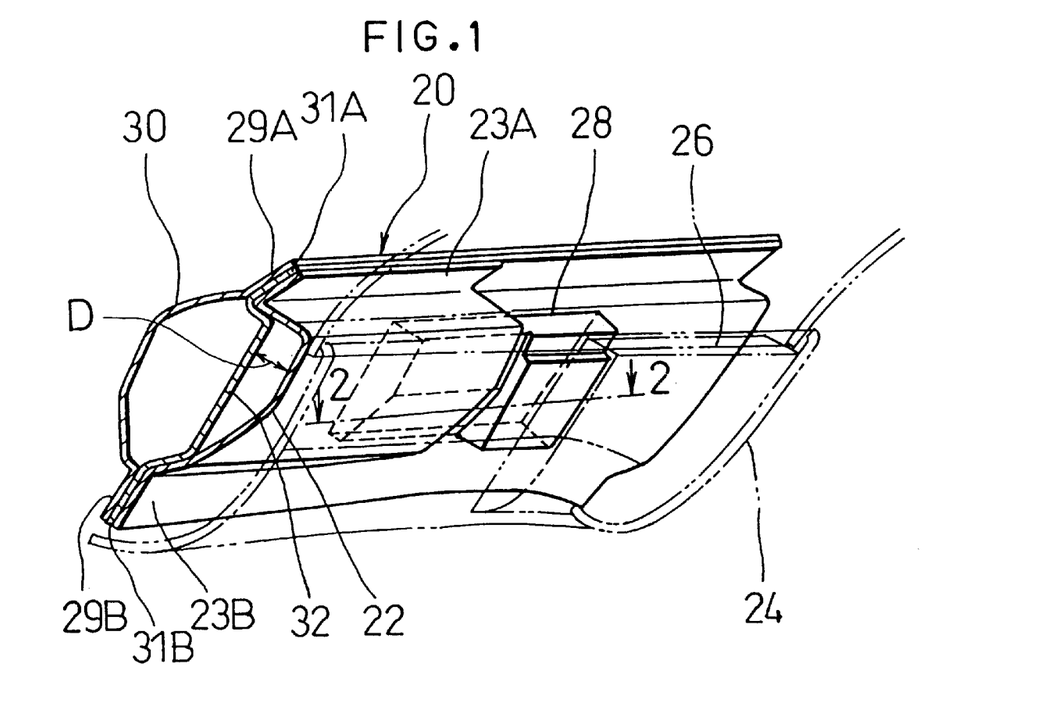
FIG. 1 is a perspective view of one embodiment of the collision energy absorbing structure of a vehicle body upper portion of an automobile according to the present invention, viewed in the direction 1 in FIG. 4.
Figure 2:
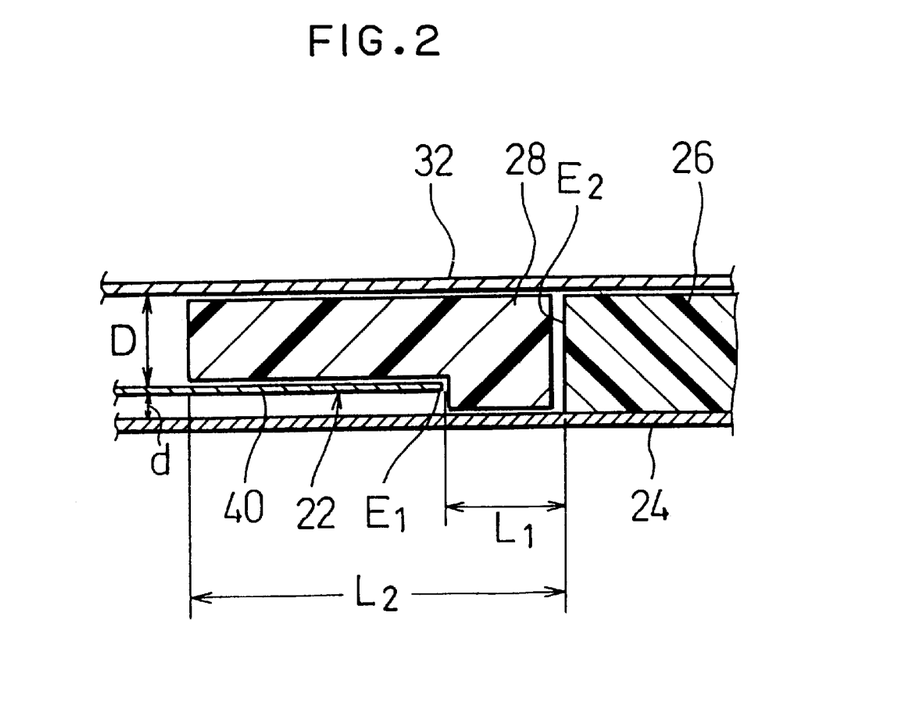
FIG. 2 is a sectional view taken along the line 2—2 of FIG. 1.

With reference to FIG. 1 showing a perspective view and FIG. 2 showing a section, a collision energy absorbing structure absorbs collision energy in a vehicle body upper portion of an automobile provided with a roofside rail 20 which is a structural member, and comprises an energy absorbing panel 22, an interior trim material 24 and two energy absorbing means 26, 28. The roofside rail 20 is formed as a closed structure by joining respective flanges 29A, 31A and 29B, 31B of an outer panel 30 and an inner panel 32 arranged with a space inward of the outer panel 30 by spot-welding, and extends forward and backward of the vehicle body. The outer panel 30 and the inner panel 32 are made of steel plate.

The energy absorbing panel 22 is made of steel plate having a thickness smaller than the thicknesses of the outer panel 30 and the inner panel 32, is disposed in the inward of the inner panel 32 at a distance D (FIG. 1 and FIG. 3), and is joined to the roofside rail 20 by spot-welding flanges 23A, 23B to the flange joint portion of the roofside rail 20. As a result, the energy absorbing panel 22 extends by a certain length in the forward and backward direction of the vehicle body while keeping the distance D. The distance D is required for energy absorption and is 10 to 30 mm, and preferably about 20 mm. The vehicle body, as shown in FIG. 4, includes a front pillar 34, a center pillar 36 and a rear pillar 38 respectively connected to the roofside rail 20, while the energy absorbing panel 22 extends from the front pillar 34 to the vicinity of the rear pillar 38 in the illustrated embodiment. The roofside rail 20 further extends rearward.

The thickness of the energy absorbing panel 22 is 0.4 to 0.8 mm, preferably about 0.6 mm. On the other hand, the thickness of the outer panel 30 is 0.8 to 1.0 mm, and the thickness of the inner panel 32 is 1.0 to 1.6 mm, preferably about 1.4 mm. The respective thicknesses of the outer panel and the inner panel may be made reverse from the above.

The roofside garnish 24, which is an interior trim material, is molded from a hard resin such as polypropylene and is arranged at a distance d (FIG. 3) inward of the energy absorbing panel 22. The roofside garnish has energy absorbing means 26 arranged to adjoin each other at a terminal part or portion 40 in the longitudinal extension of the energy absorbing panel 22. The distance d is not required for energy absorption because, as shown in FIG. 2, there is the distance D necessary for energy absorption between the energy absorbing panel 22 and the inner panel 32, and the energy absorbing means 26 occupies a greater distance than the distance D. The energy absorbing means 26 is made of urethane foam in the illustrated embodiment and is adhered to the roofside garnish 24.

The rigidity of the terminal portion in the energy absorbing means such as a lattice or urethane foam is substantially the same at the terminal portion and any other portion. However, the farther away from the terminal of the energy absorbing means toward a portion without the energy absorbing means, the less the amount of energy absorption, as shown in FIG. 7(b). Namely, in the range from the terminal $E_2$ of the energy absorbing means to a distance F where no energy absorbing means exists, the farther the distance F gets, the smaller the amount of energy absorption. Therefore, by selecting the distance F properly, the energy absorbing means 26 can be used as means for compensating a reduction in the amount of energy absorption of the terminal portion 40 of the energy absorbing panel 22.

The energy absorbing means 26, in the embodiment shown in FIG. 2, is arranged to adjoin the terminal portion 40 of the energy absorbing panel 22 such that the terminal $E_2$ of the energy absorbing means 26 is spaced apart from the terminal $E_1$ of the energy absorbing panel 22 by a distance $L_1$. Consequently, a distance $L_2$ from the terminal portion 40 of the energy absorbing panel 22 to the terminal $E_2$ of the energy absorbing means 26 is a transitional zone. The amount of energy absorption in this transitional zone depends on the size of the distance $L_1$. For example, where the distance $L_1$ is determined such that the terminal $E_1$ of the energy absorbing panel 22 comes at the point F in FIG. 7(b), that is, where the amount of energy absorption of the energy absorbing means 26 becomes zero, the amount of energy absorption becomes H as shown in FIG. 7(c) and no compensation occurs. On the other hand, where the terminal $E_2$ of the energy absorbing means 26 and the terminal $E_1$ of the energy absorbing panel 22 are brought into contact to make the distance $L_1$ zero, the amount of energy absorption becomes I and the reduced amount of energy absorption of the terminal portion of the energy absorbing panel 22 can be compensated.

It is further enabled by the energy absorbing means 28 to compensate the reduced amount of energy absorption in the transitional zone. In the embodiment shown in FIG. 2, the energy absorbing means 28 is a urethane foam disposed substantially over the entire transitional zone and adhered to the inner panel 32. Preferably, the thickness, shape, rigidity and the like of each portion of the energy absorbing means 28 are determined so that, by providing the energy absorbing means 28, the energy absorption represented by curve G in FIG. 7(c) is achieved. That is, the reduction in the amount of energy absorption of the terminal portion 40 of the energy absorbing panel 22 can be completely compensated, and the amount of energy absorption curve in the transitional zone may be substantially flat.

According to this embodiment, since the energy compensating means are formed from the two energy absorbing means 26, 28, the energy absorbing means 28 can be formed without affecting a degree of freedom in designing the interior trim material 24 having the energy absorbing means 26 and the energy absorbing panel 22. Also, selections of material and shape of the energy absorbing means 28 can be relatively easy, and the reduced amount of energy absorption generated in the transitional zone is easily compensated.

Figure 3:
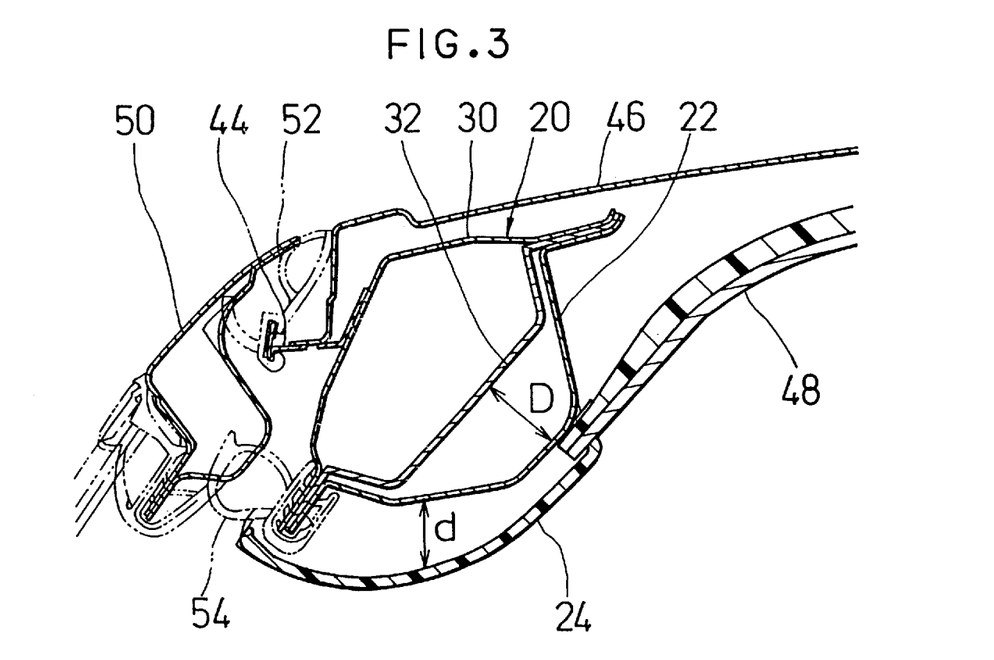
FIG. 3 is a sectional view of one embodiment of the collision energy absorbing structure of a vehicle body upper portion of an automobile according to the present invention taken along the line 3—3 of FIG. 4.
Figure 4:
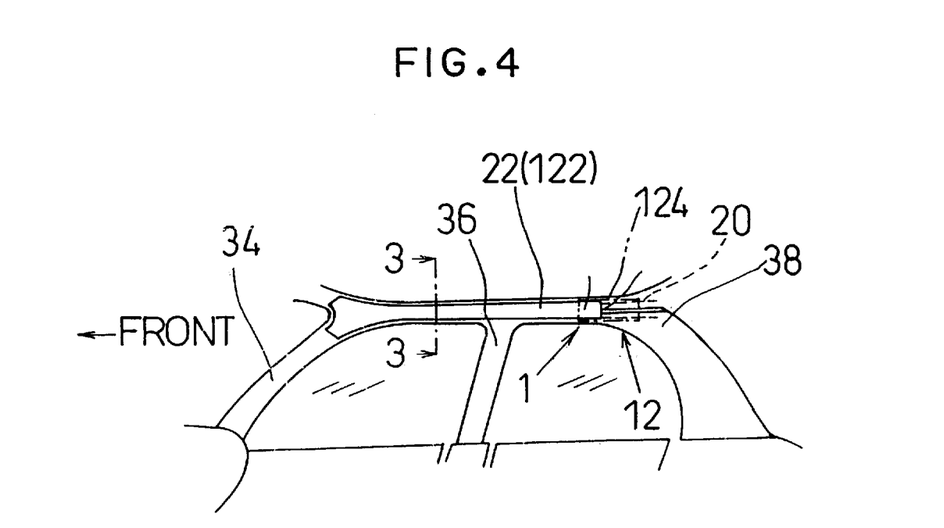
FIG. 4 is a side view of the collision energy absorbing structure of a vehicle body upper portion of an automobile according to the present invention, viewed from the vehicle interior of the automobile.

As shown in FIG. 3, in the vehicle body upper portion a drip channel 44 is welded to the roofside rail 20, and the roof panel 46 is welded to the drip channel 44. The roofside garnish 24 and a roof liner 48, which are the interior trim material, are stretched across the interior of the vehicle. The door 50, when closed, is brought in tight contact with a weather strip 52 attached to the drip channel 44, and an opening trim 54 attached to the joint portion of the flange.

In the following embodiments, the same reference numerals are used for corresponding parts of the embodiments shown in FIGS. 1 and 2 and detailed descriptions are omitted.

Figure 5A:
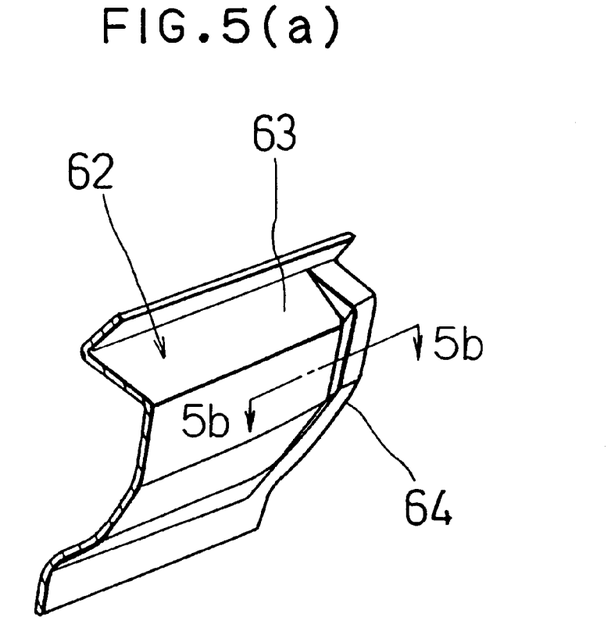
FIG. 5(a) is a perspective view of the energy absorbing panel and FIG. 5(a) is a sectional view taken along the line 5b—5b of (a), also including an interior trim material.
Figure 5B:
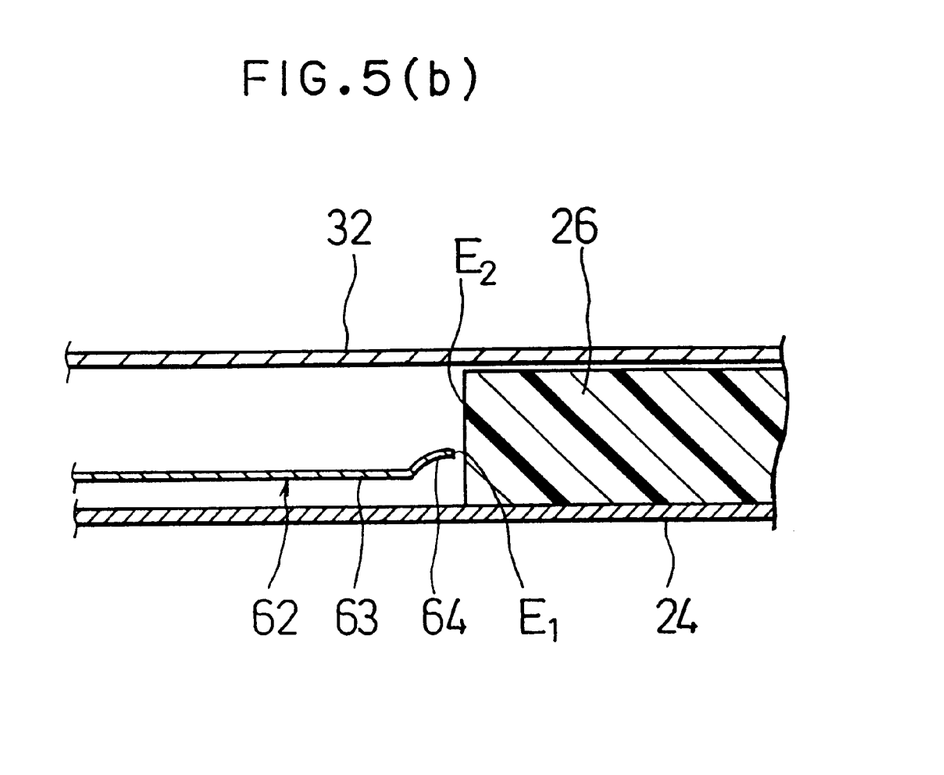

In the embodiment shown in FIG. 5, the energy absorbing panel 62 has a reinforcing structure 64 provided at the terminal portion 63 in its longitudinal direction. Other structures of the energy absorbing panel 62 are substantially the same as the energy absorbing panel 22. As mentioned above, the reduction in the amount of energy absorption of the terminal portion of the energy absorbing panel is attributable to lowering in rigidity of the terminal portion. Therefore, the reinforcing structure 64 is formed at the terminal portion 63, whereby the rigidity of the terminal portion 63 is raised and together with the energy absorbing means 26 compensate the reduction in energy absorption. By varying the irregularity or the sectional shape of the reinforcing structure 64 or bending the reinforcing structure 64, rigidity can be increased and the degree of the rigidity can be changed. In this embodiment, the terminal $E_1$ of the energy absorbing panel 62 is made as close as possible to the terminal $E_2$ of the energy absorbing means 26. According to this embodiment, only by reinforcing the terminal portion of the energy absorbing panel, the reduction in energy absorption in the transitional zone can be compensated.

Figure 6A:
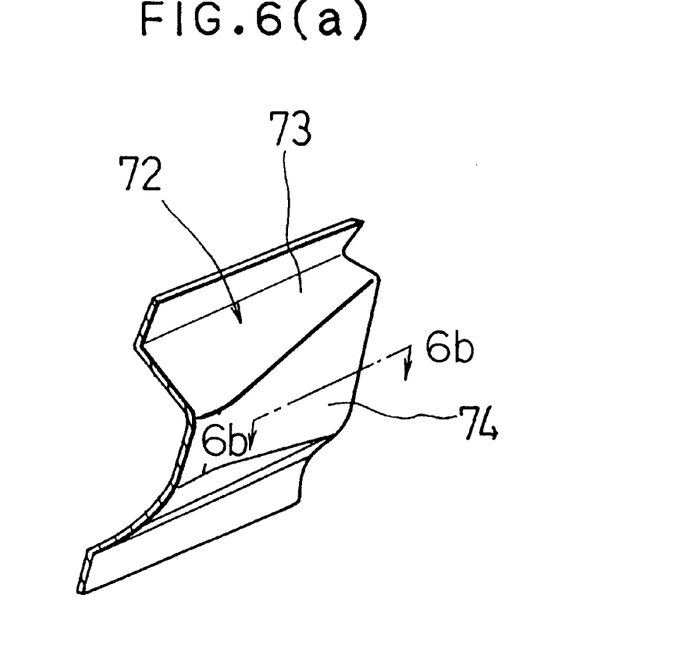
Figure 6B:
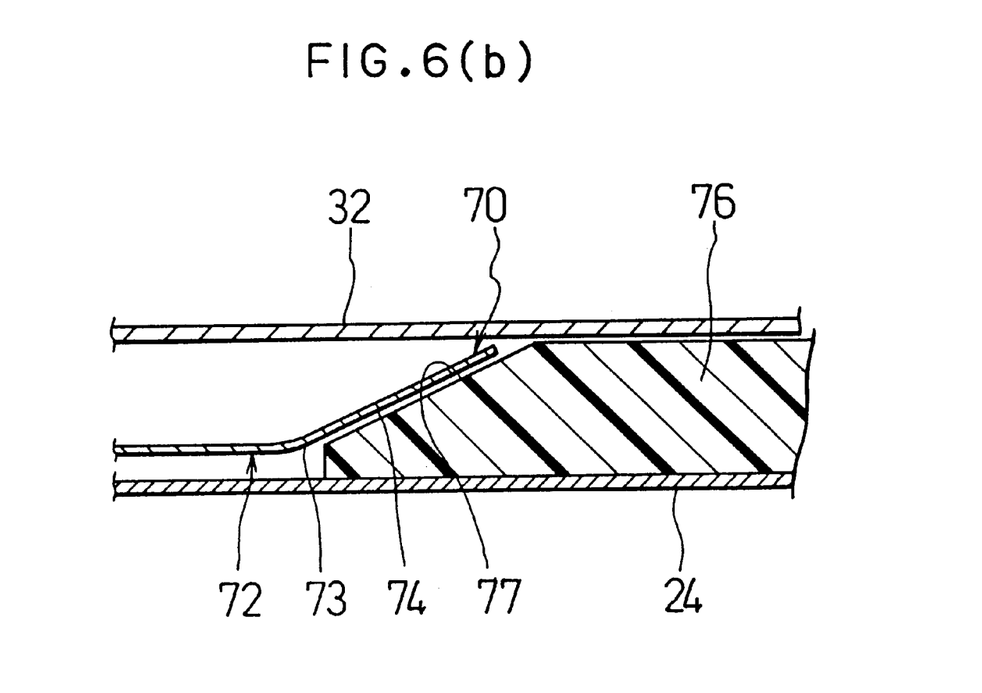
FIG. 6(b) is a perspective view of the energy absorbing panel and FIG. 6(b) is a sectional view taken along the line 6b—6b of FIG. 6(a), also including the interior trim material.

In the embodiment shown in FIG. 6, a reinforcing structure 70 includes an energy absorbing panel 72 having an inclined surface 74 formed at the terminal portion 73 thereof, which is inclined toward the inner panel 32. Reinforcing structure 70 further includes an energy absorbing means 76 having an inclined surface 77 extending along the inclined surface 74 of the energy absorbing panel 72. Other structures of the energy absorbing panel 72 and the energy absorbing means 76 are substantially the same as the energy absorbing panel 22 and the energy absorbing means 26 of the first embodiment. In this embodiment, the inclined surfaces 74 and 77 are opposed to each other to overlap the energy absorbing panel 72 and the energy absorbing means 76, thereby compensating the reduced amount of energy absorption by a cooperation of both inclined surfaces 74, 77. The amount of energy absorption to be compensated can be adjusted by changing the shape, size or angle of inclination of the portions facing each other of the inclined surfaces 74, 77.

Figure 8A:
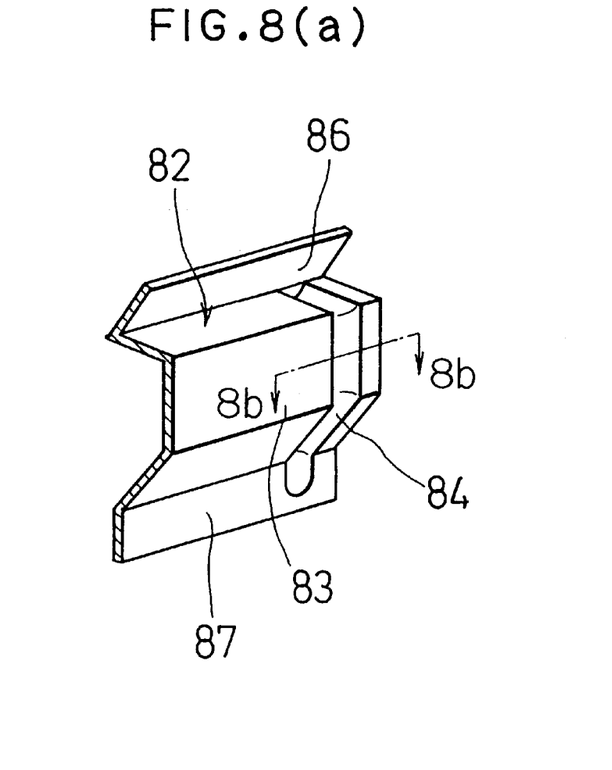
FIG. 8(a) is a perspective view of the energy absorbing panel and FIG. 8(b) is a sectional view taken along the line 8b—8b of FIG. 8(a), also including the interior trim material.
Figure 8B:
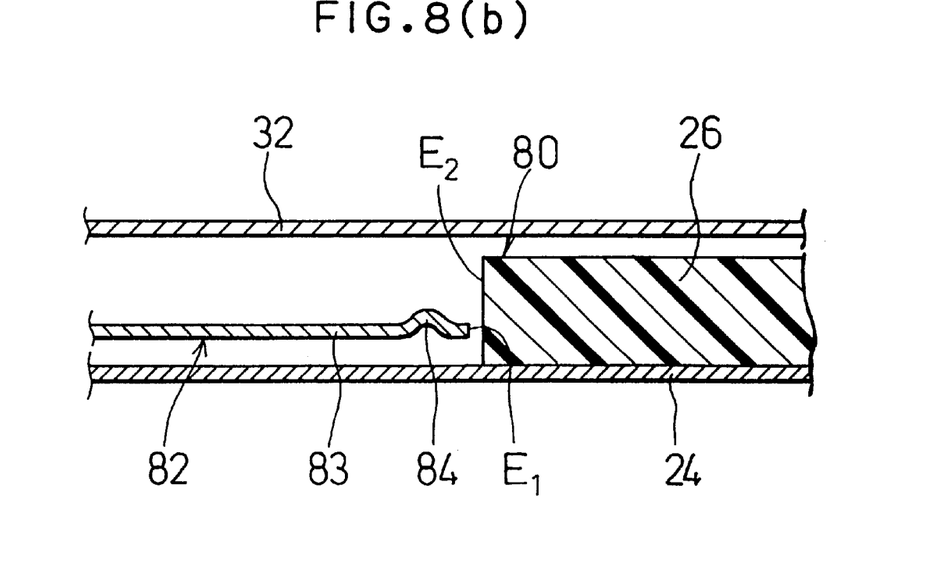

In the embodiment shown in FIG. 8, the energy compensating means 80 includes a reinforcing structure 84 provided in the longitudinal direction terminal portion 83 of the energy absorbing panel 82, and the energy absorbing means 26. The reinforcing structure 84 is a bead. Namely, the terminal portion 83 is press-molded, so that one side surface is recessed like a groove and the other side surface is expanded outward in a convex shape, thereby enhancing the rigidity. The bead 84 covers the energy absorbing panel 82 except the flanges 86, 87. The bead can be expanded inward, contrary to the illustration. The other constitution of the energy absorbing panel 82 is substantially the same as the energy absorbing panel 22 shown in FIGS. 1 and 2. In the embodiment shown in FIG. 8, the terminal $E_1$ of the energy absorbing panel 82 is made as close as possible to the terminal $E_2$ of the energy absorbing means 26. According to this embodiment, molding for adding the bead to the terminal portion of the energy absorbing panel is easy, and the amount of energy to be compensated can be adjusted by varying the shape, width, depth and the like of the bead.

Figure 9A:
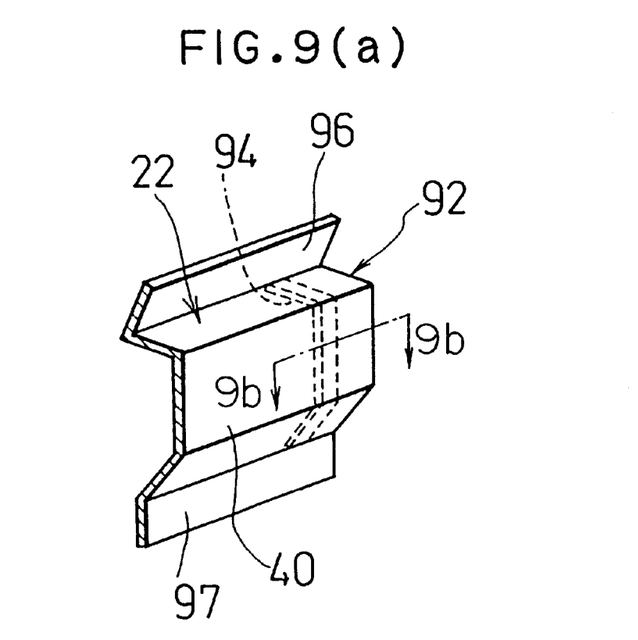
FIG. 9(a) is a perspective view of the energy absorbing panel and FIG. 9(b) is a sectional view taken along the line 9b—9b of FIG. 9(a), also including the interior trim material.
Figure 9B:
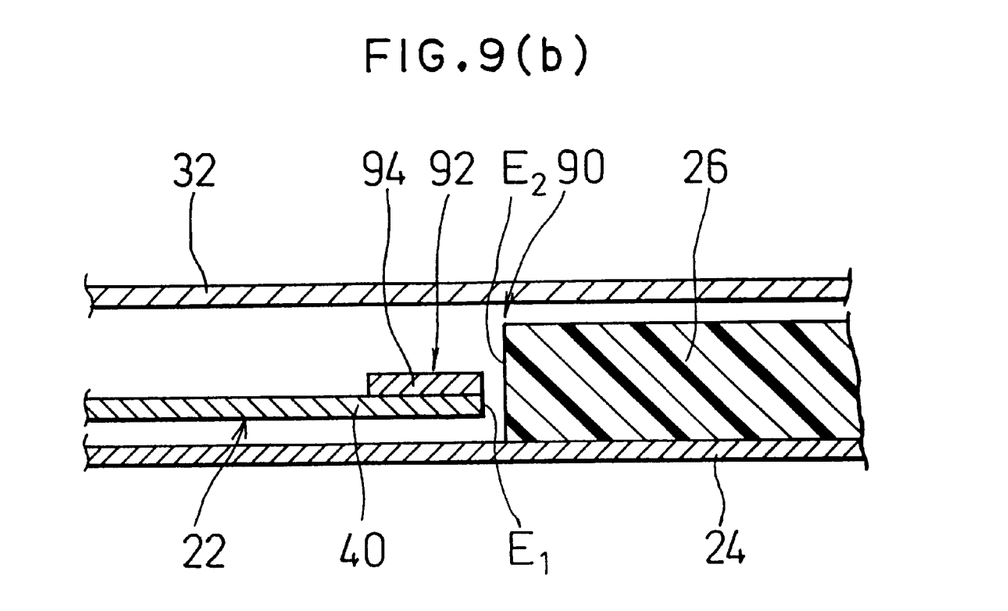

In the embodiment shown in FIG. 9, the energy compensating means 90 includes the reinforcing structure 92 provided at the terminal portion 40 in the longitudinal direction of the energy absorbing panel 22 and the energy absorbing means 26. The reinforcing structure 92 is a thick portion with the terminal portion 40 of the energy absorbing panel 22 thickened by spot-welding a plate material 94 to the terminal 40 of the energy absorbing panel 22. The plate material 94 has a size to cover the energy absorbing panel 22 except the flanges 96, 97. In this embodiment, the terminal $E_1$ of the energy absorbing panel 22 is made as close as possible to the terminal $E_2$ of the energy absorbing means 26. According to this embodiment, the reinforcing structure thickened by attaching another plate material to the energy absorbing panel, while the amount of energy to be compensated can be adjusted by varying the material quality, shape, thickness and the like of the plate material.

Figure 10A:
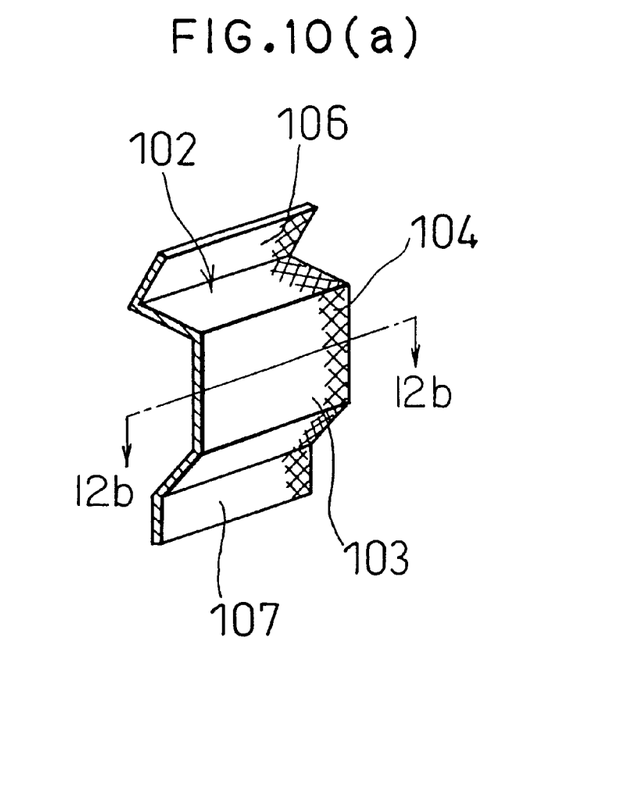
FIG. 10(a) is a perspective view of the energy absorbing panel and FIG. 10(b) is a sectional view taken along the line 10b—10b of FIG. 10(a), also including the interior trim material.
Figure 10B:
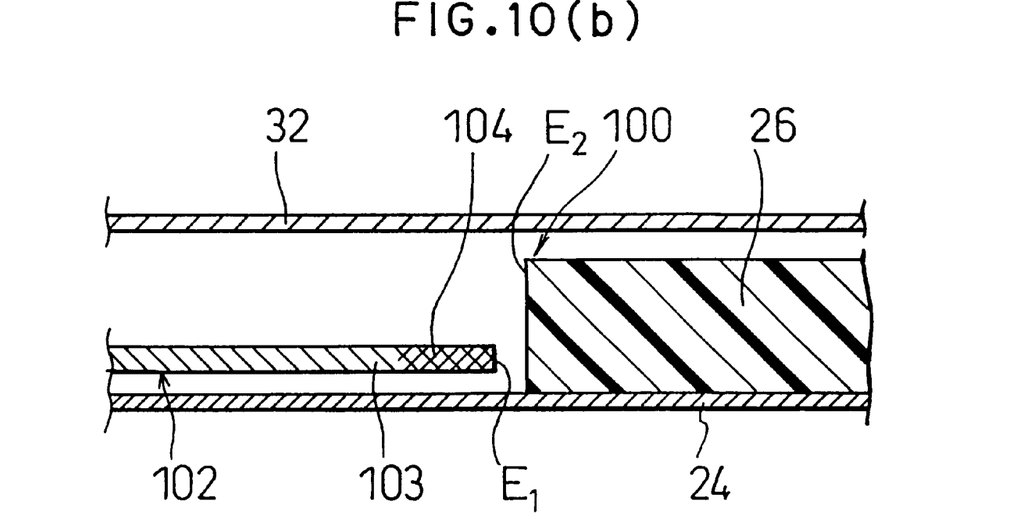

In the embodiment shown in FIG. 10, the energy compensating means 100 includes a reinforcing structure 104 provided at the terminal 103 in the longitudinal direction of the energy absorbing panel 102 and the energy absorbing means 26. The reinforcing structure 104 is the portion shown by double hatching for convenience' sake in explaining, where the terminal portion 103 is laser-hardened. The hardened portion can be provided over the entire portion of the energy absorbing panel 102, and besides, can be provided on the portion except the flanges 106, 107. In this embodiment, the terminal $E_1$ of the energy absorbing panel 100 is made as close as possible to the terminal $E_2$ of the energy absorbing means 26. According to this embodiment, by varying the width, position, conditions and the like of hardening, the amount of energy to be compensated can be adjusted.

Figure 11A:
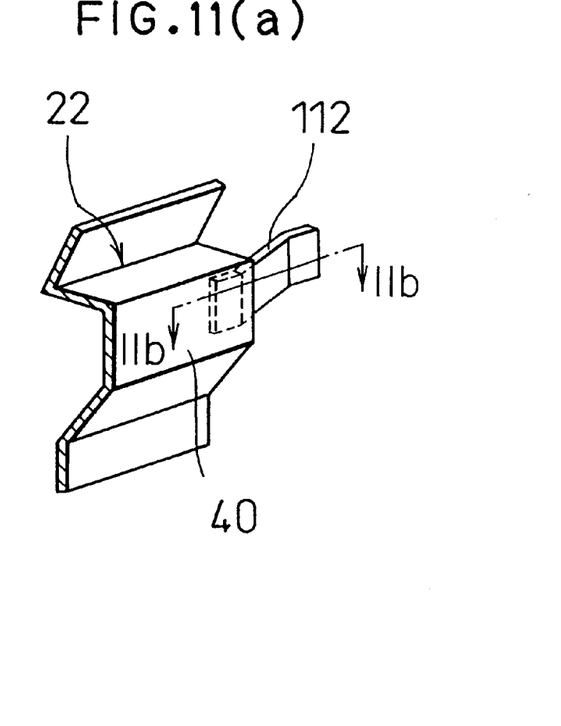
FIG. 11(a) is a perspective view of the energy absorbing panel and FIG. 11(b) is a sectional view taken along the line 8b—8b of FIG. 11(a), also including the interior trim material.
Figure 11B:
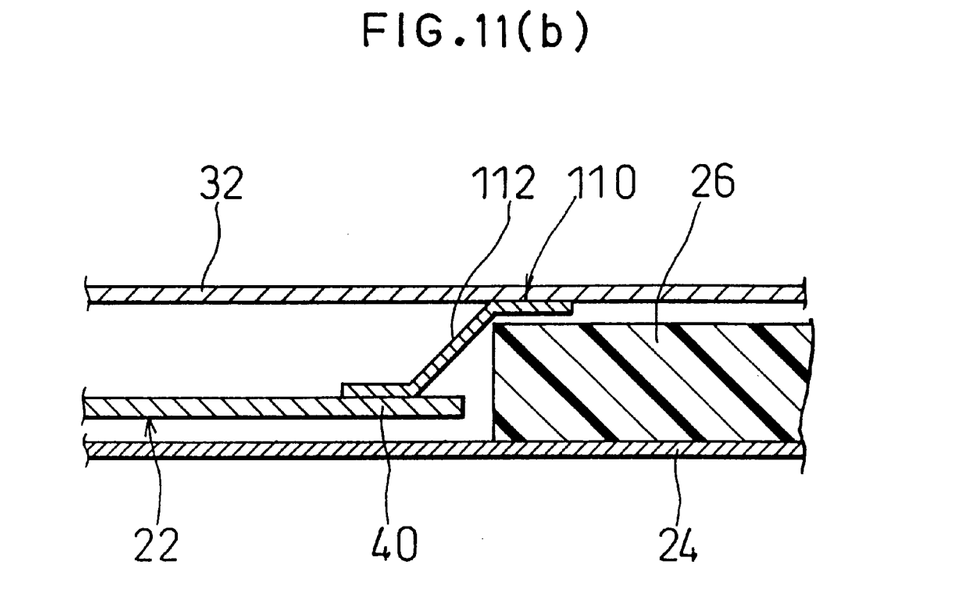

In the embodiment shown in FIG. 11, the energy compensating means 110 includes a plate metal fixture, i.e., a plate metal bulk 112 provided at the terminal portion 40 in the longitudinal direction of the energy absorbing panel 22, and the energy absorbing means 26. The bulk 112 is formed by bending a steel plate in an approximately S-like shape, and is attached to the energy absorbing panel 22 and the inner panel 32 by spot-welding. According to this embodiment, the amount of energy to be compensated can be adjusted by varying the material quality, shape, thickness and the like of the plate metal fixture, i.e., the plate metal bulk.

In the above-mentioned embodiments, the energy absorbing means attached to the interior trim material is disposed to adjoin the terminal portion rearward of the energy absorbing panel. Instead of this or together with this, however, it is possible to adjoin the energy absorbing means with the terminal portion forward of the energy absorbing panel, that is, as shown in FIG. 4, the terminal in the joint portion of the roofside rail 20 and the front pillar 34.

Figure 12:
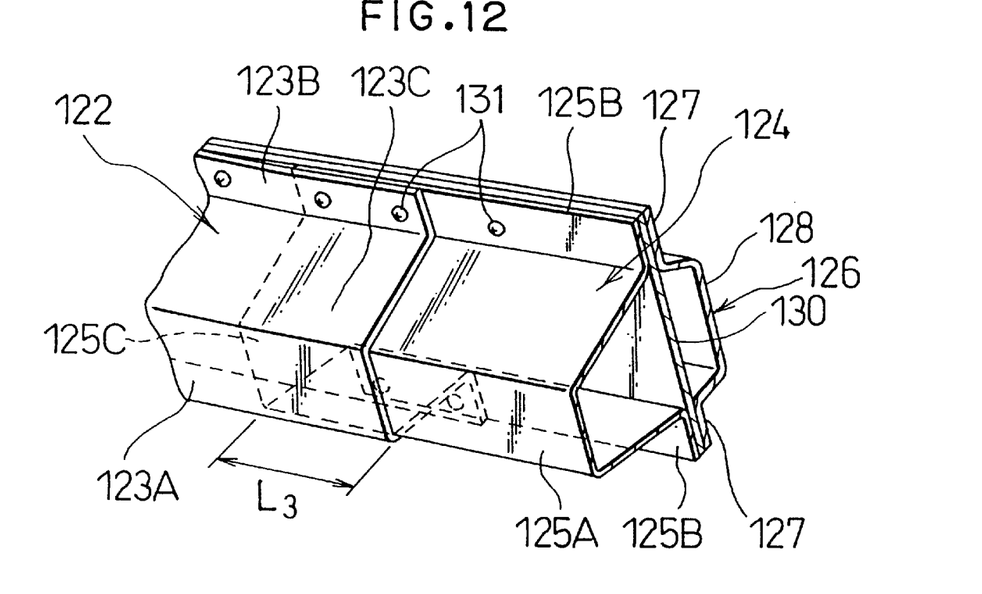
FIG. 12 is a perspective view showing still another embodiment of the collision energy absorbing structure of a vehicle body upper portion of an automobile according to the present invention, as viewed in the direction of 12 of FIG. 4.

In the embodiment shown in FIG. 12, the collision energy absorbing structure comprises an energy absorbing panel 122 and an energy absorbing panel 124 as means for compensating the reduced amount of energy absorption of the terminal portion of the energy absorbing panel 122. A roofside rail 126 is formed such that an outer panel 128 and an inner panel 130 arranged at a distance inward of the outer panel 128 are spot-welded at respective flange portions to form a closed structure and extend in the forward and backward direction of the vehicle body.

The two energy absorbing panels 122, 124 are 0.6 mm thick steel plate and have a thickness smaller than those of the outer panel 128 and the inner panel 130. The two energy absorbing panels 122, 124 have substantially the same sectional shape and thickness as shown in FIG. 12, and have respectively an abdominal portion 123A, 125A arranged at a distance inward of the inner panel 130 and two flange portions 123B, 125B connected to the abdominal portion. The maximum distance among distances from the inner panel 130 is 10 to 30 mm, which is necessary for energy absorption, which is set at 20 mm in the illustrated embodiment. The two energy absorbing panels 122, 124 are arranged in the longitudinal direction of the roofside rail 126 so as to overlap the adjacent terminal portions 123C, 125C. Without joining the abdominal portion 123A, 125A, namely, with the abdominal portion 123A, 125A kept in the overlapped state, the two energy absorbing panels 122, 124 are joined to the roofside rail 126 by spot-welding 131 respectively the flange portions 123B, 125B to two flange joint portions 127. As a result, the two energy absorbing panels 122, 124 extend in the forward and backward direction of the vehicle body while maintaining the distance from the inner panel 130. As shown in FIG. 4, the energy absorbing panel 122 extends from the front pillar 34 to the rear of the center pillar 36, and the energy absorbing panel 124 extends to the rear pillar 38.

The terminal portions of the abdominal portions 123A, 125A of the two energy absorbing panels remain overlapped because, if the terminal portions of the adjacent abdominal portions are fixed by spot-welding or the like, the rigidity of the terminal portions become overly enhanced and exceeds the required amount of energy absorption. According to this embodiment, since the two terminal portions of the energy absorbing panels are overlapped, the amount of energy absorption of the terminal portion of the essential energy absorbing panel can be less reduced, so that the amount of energy absorption can be brought close to the required amount of energy absorption.

Figure 13:
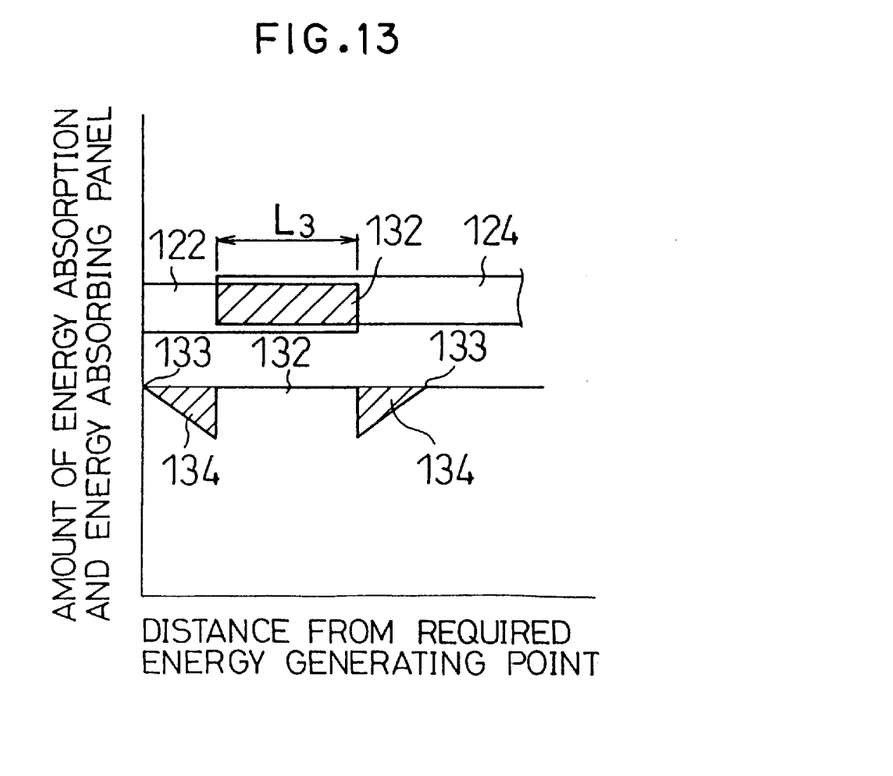
FIG. 13 is a graph showing the amount of energy absorption obtained by the collision energy absorbing structure shown in FIG. 12 and the energy absorbing panel with respect to distance.

When the distance $L_3$ where the terminal portions 123C, 125C of the two energy absorbing panels 122, 124 overlap becomes too great, not only the rigidity of the terminal portion becomes high, but also it causes a waste of material. On the other hand, when the distance $L_3$ becomes too small, a sufficient energy absorption cannot be attained. As a result of a simulation in which a head form is collided, it turned out that the distance $L_3$ is preferably 50–70 mm, and most preferably $L_3$ is 60 mm. In this case, as shown in FIG. 13, a portion 134 is generated where the amount of energy absorption is lowered between the portion 132 where the terminal portions are overlapped and the portion 133 where the lowering of the amount of energy absorption begins. However, the head form having a predetermined curvature, the existence of the portion 134 where the amount of energy absorption is lowered does not matter. According to this embodiment, a wastefulness of lengthening more than necessary the distance where the two energy absorbing panels are overlapped can be eliminated, and the required amount of energy absorption can be substantially ensured.

Figure 14:
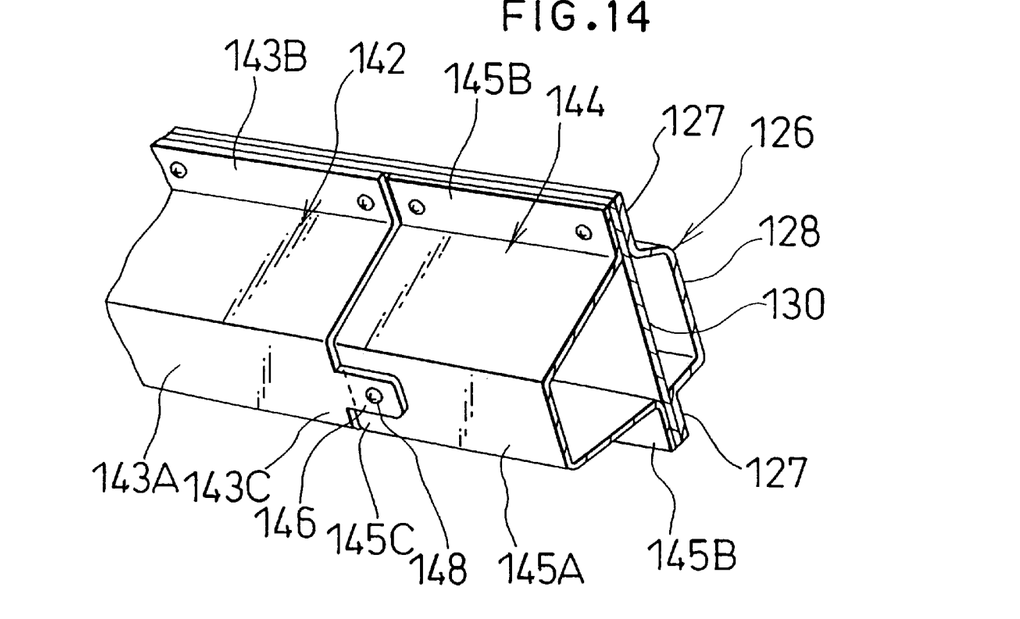
FIG. 14 is a perspective view similar to FIG. 12, showing still another embodiment of the collision energy absorbing structure of a vehicle body upper portion of an automobile according to the present invention.

In the embodiment shown in FIG. 14, two energy absorbing panels 142, 144 have an abdominal portion 143A, 145A arranged at a distance inward of the inner panel 130 and two flange portions 143B, 145B connected to the abdominal portion 143A, 145A, respectively. The two energy absorbing panels 142, 144 have substantially the same sectional shape and substantially the same thickness, arranged in the longitudinal direction of the roofside rail 126 such that the terminal portions 143C, 145C adjacent to each other do not overlap, and are joined to the roofside rail 126 respectively by spot-welding the flange portions 143B, 145B to the two flange joint portions 127 of the roofside rail 126. As a result, the two energy absorbing panels 142, 144 extend in the forward and backward direction of the vehicle body while maintaining the distance from the inner panel 130. The abdominal portions 143A, 145A of the two energy absorbing panels 142, 144 are joined at one portion respectively by connecting a tongue 146 projecting rearward from the terminal portion 143C of the abdominal portion 143A of one energy absorbing panel 142 to the terminal portion 145C of the abdominal portion 145A with rivets or by spot-welding 148.

Figure 15:
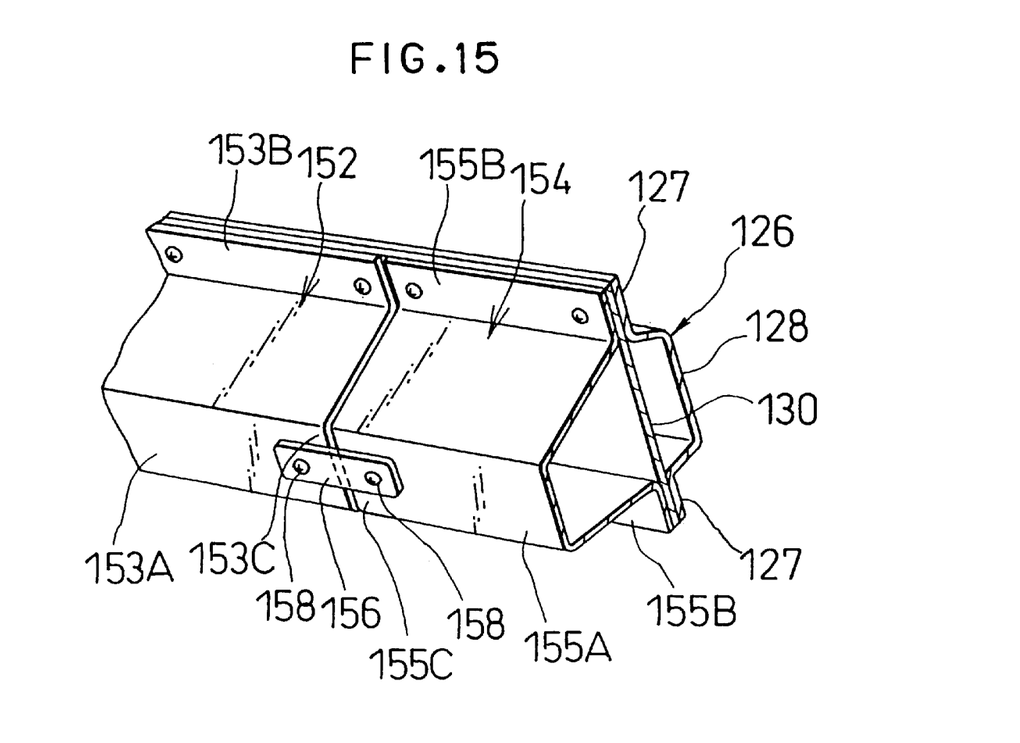
FIG. 15 is a perspective view similar to FIG. 12, showing still another embodiment of the collision energy absorbing structure of a vehicle body upper portion of an automobile according to the present invention.

In the embodiment shown in FIG. 15, two energy absorbing panels 152, 154 have respectively an abdominal portion 153A, 155A arranged at a distance inward of the inner panel 130, and two flange portions 153B, 155B connected to the abdominal portion. The two energy absorbing panels 152, 154 have substantially the same sectional shape and substantially the same thickness, arranged in the longitudinal direction of the roofside rail 126 such that the terminal portions 153C, 155C adjacent to each other do not overlap, and are joined to the roofside rail 126 by spot-welding the flange portions 153B, 155B to the two flange joint portions 127 of the roofside rail 126. As a result, the two energy absorbing panels 152, 154 extend in the forward and backward direction of the vehicle body while maintaining the distance from the inner panel 130. The abdominal portion 153A, 155A of the two energy absorbing panels 152, 154 are joined at one portion respectively by attaching a plate member 156 crossing both abdominal portions 153A, 155A and respective abdominal portions with a rivet or by spot-welding 158.

In the embodiments shown in FIGS. 14 and 15, to compensate the reduction in the amount of energy absorption of the terminal portion of the essential energy absorbing panel, only a part of the terminal portions of the adjoining abdominal portions is joined by using the tongue 146 or the plate member 156. By fully joining the terminal portions of the adjoining abdominal portions like the above-mentioned overlapping, the rigidity of the joint portion becomes too great. However, by joining a part of the terminals of the adjoining abdominal portions, the rigidity of the terminal portions can be maintained properly, so that the reduction in the amount of energy absorption of the essential energy absorbing panel can be compensated. From this point of view, the thickness of the tongue 146 is set to be the same as the thickness of the energy absorbing panel 142, the thickness of the plate member 156 is set to be the same as the thickness of the energy absorbing panel 152, and further, the strength of the rivet or the spot-welding 148, 158 is set to be sheared by an energy not exceeding the required amount of energy absorption.

The collision energy absorbing structure of a vehicle body upper portion of an automobile shown in FIGS. 12 through 15, has the following functions. When a collision force acts from the inside to outside of a passenger compartment, the essential metal energy absorbing panel is elastically deformed to absorb the collision energy. In the embodiment in FIG. 12, when a collision force acts on a portion where the terminal portions 123C, 125C of the two energy absorbing panels 122, 124 are overlapped, the terminal portions are mutually displaced to be plastically deformed while generating a frictional force. Due to this frictional force and plastic deformation, the collision energy is absorbed. Also, in the embodiments shown in FIGS. 14 and 15, when a collision force acts on the terminal portions of the two energy absorbing panels 142, 144, 152, 154, since the respective abdominal portions of the adjoining terminal portions are joined at a part, the terminal portions are plastically deformed, pulling each other at the joint portion, while being plastically deformed at the other portions. Thereby, the collision energy is absorbed.

What we claim is:

1. A collision energy absorbing structure of a vehicle body upper portion of an automobile, the vehicle body upper portion comprising a structural member extending in the longitudinal direction and a resin interior trim material spaced inwardly of the structural member, the structural member including an outer panel having a pair of flange portions and an inner panel spaced inwardly of the outer panel and having a pair of flange portions, the structural member being a pillar or roofside rail and being formed to have a closed structure with the outer panel and the inner panel joined at their respective flange portions, said collision energy absorbing structure comprising:

first energy absorbing means and second energy absorbing means disposed longitudinally of said first energy absorbing means, at least said first energy absorbing means being a metal energy absorbing panel, wherein said metal energy absorbing panel has a thickness smaller than the thickness of said outer panel and smaller than the thickness of said inner panel, includes two terminal portions, and extends in the longitudinal direction between said two terminal portions by a predetermined length, said metal energy absorbing panel being joined to said flange portions of said inner panel and having an abdominal portion spaced inwardly of said inner panel and disposed between said inner panel and said interior trim material, wherein said second energy absorbing means is disposed between said inner panel and said interior trim material adjacent to at least one terminal portion of said metal energy absorbing panel to absorb a collision energy to compensate for a reduced amount of energy absorption of said at least one terminal portion of said metal energy absorbing panel when collision load is exerted outwardly from the inside of said interior trim material to deform said abdominal portion of said metal energy absorbing panel.

2. A collision energy absorbing structure of a vehicle body upper portion of an automobile according to claim 1, wherein said second energy absorbing means is provided in said interior trim material on an extension in a longitudinal direction of said metal energy absorbing panel.

3. A collision energy absorbing structure of a vehicle body upper portion of an automobile according to claim 1, wherein said second energy absorbing means is made of resin.

4. A collision energy absorbing structure of a vehicle body upper portion of an automobile according to claim 1, wherein said metal energy absorbing panel includes a reinforcing structure provided at said terminal portion of said metal energy absorbing panel.

5. A collision energy absorbing structure of a vehicle body upper portion of an automobile according to claim 4, wherein said reinforcing structure is formed from a bead either projecting outward or inward from said terminal portion of said metal energy absorbing panel.

6. A collision energy absorbing structure of a vehicle body upper portion of an automobile according to claim 4, wherein said reinforcing structure is formed as a thick portion with a thickness greater than the thickness of said metal energy absorbing panel.

7. A collision energy absorbing structure of a vehicle body upper portion of an automobile according to claim 4, wherein said reinforcing structure comprises a hardened portion of said metal energy absorbing panel.

8. A collision energy absorbing structure of a vehicle body upper portion of an automobile according to claim 1, wherein said metal energy absorbing panel includes an inclined surface provided at said terminal portion of said metal energy absorbing panel and inclined toward said inner panel, and said second energy absorbing means includes an inclined surface extending along said inclined surface of said metal energy absorbing panel.

9. A collision energy absorbing structure of a vehicle body upper portion of an automobile according to claim 1, wherein said metal energy absorbing panel further includes a plate metal fixture joined to said terminal portion of said metal energy absorbing panel and to said inner panel.

10. A collision energy absorbing structure of a vehicle body upper portion of an automobile according to claim 1 wherein said second energy absorbing means is a metal energy absorbing panel having an abdominal portion disposed inwardly from said inner panel and flange portions connected to said abdominal portion, and wherein said second energy absorbing means has a terminal portion and wherein the abdominal portion at the terminal portion of said second energy absorbing means is overlapped by an overlapped length with the abdominal portion at said at least one terminal portion of said first energy absorbing means.

11. A collision energy absorbing structure of a vehicle body upper portion of an automobile according to claim 10, wherein said overlapped length in the longitudinal direction of said terminal portions of said first and second energy absorbing means is in the range of 50 to 70 mm.

12. A collision energy absorbing structure of a vehicle body upper portion of an automobile according to claim 1, wherein said second energy absorbing means is a metal panel having an abdominal portion disposed inwardly from said inner panel and flange portions connected to said abdominal portion, and wherein said second energy absorbing means includes a terminal portion and is disposed to adjoin said first energy absorbing means so that said terminal portion of said second energy absorbing means does not overlap said at least one terminal portion of said first energy absorbing means, and said second energy absorbing means is joined with said first energy absorbing means at only a part of respective abdominal portions of said first and second energy absorbing means.

13. A collision energy absorbing structure of a vehicle body upper portion of an automobile according to claim 12, wherein one of said first and second energy absorbing means is provided with a tongue extending toward the other of said first and second energy absorbing means and said first and second energy absorbing means are joined through the tongue and fastening means.

14. A collision energy absorbing structure of a vehicle body upper portion of an automobile according to claim 12, wherein said second energy absorbing means further includes a plate member and said first and second energy absorbing means are joined through the plate member and fastening means.

15. A collision energy absorbing structure of a vehicle body upper portion of an automobile, the vehicle body upper portion comprising a structural member extending in the longitudinal direction and a resin interior trim material spaced inwardly of the structural member, the structural member including an outer panel having a pair of flange portions and an inner panel spaced inwardly of the outer panel and having a pair of flange portions, the structural member being formed to have a closed structure with the outer panel and the inner panel joined at their respective flange portions, said collision energy absorbing structure comprising:

a first metal energy absorbing panel having a thickness smaller than the thickness of said outer panel and the thickness of said inner panel, said first metal energy absorbing panel having two terminal portions and extending in the longitudinal direction between said two terminal portions for a first panel length, said first metal energy absorbing panel being joined to said flange portions of said inner panel and having an abdominal portion spaced inwardly of said inner panel and disposed between said inner panel and said interior trim material; and a second metal energy absorbing panel having a thickness smaller than the thickness of said outer panel and smaller than the thickness of said inner panel, said second metal energy absorbing panel having two terminal portions and extending in the longitudinal direction between said two terminal portions for a second panel length, said second metal energy absorbing panel being joined to said flange portions of said inner panel and having an abdominal portion spaced inwardly of said inner and disposed between said inner panel and said interior trim material, wherein said first and second metal energy absorbing panels have substantially the same sectional shape, and wherein said abdominal portion of said first metal energy absorbing panel is overlapped at one of said two terminal portions of said first metal energy absorbing panel with said abdominal portion at one of said two terminal portions of said second metal energy absorbing panel by an overlap length without joining the overlapped terminal portions, whereby said overlapped terminal portions absorb collision energy to compensate for a reduced amount of energy absorption of said one terminal portion of said first metal energy absorbing panel when a collision load exerts outwardly from the inside of said interior trim material to deform said abdominal portion of said first metal energy absorbing panel.

16. A collision energy absorbing structure according to claim 15, wherein said overlapped terminal portions further compensate a reduced amount of energy absorption of said one terminal portion of said second metal energy absorbing panel.

17. A collision energy absorbing structure according to claim 15, wherein said first and second metal energy absorbing panels have respectively a pair of flange portions to be joined to said flange portions of said inner panel.

18. A collision energy absorbing structure according to claim 15, wherein said structural member is a roofside rail.

19. A collision energy absorbing structure according to any one of claims 15–18, wherein said overlap length of said overlapped portions is 50–70 mm.

* * * * *